(12) United States Patent
Rigaud et al.

(10) Patent No.: US 8,303,708 B2
(45) Date of Patent: Nov. 6, 2012

(54) CONCRETE COMPOSITION

(75) Inventors: Stéphane Rigaud, Bourgoin Jallieu (FR); Philippe Fonollosa, Cremieu (FR); Gilles Chanvillard, St. Georges d'Espéranche (FR)

(73) Assignee: Lafarge, Paris (FR)

( * ) Notice: Subject to any disclaimer, the term of this patent is extended or adjusted under 35 U.S.C. 154(b) by 164 days.

(21) Appl. No.: 12/809,264

(22) PCT Filed: Dec. 19, 2008

(86) PCT No.: PCT/IB2008/003740
§ 371 (c)(1),
(2), (4) Date: Jun. 18, 2010

(87) PCT Pub. No.: WO2009/081277
PCT Pub. Date: Jul. 2, 2009

(65) Prior Publication Data
US 2010/0326326 A1 Dec. 30, 2010

(30) Foreign Application Priority Data
Dec. 21, 2007 (EP) .................................. 07356178

(51) Int. Cl.
*C04B 14/06* (2006.01)
(52) U.S. Cl. ........ 106/713; 106/644; 106/705; 106/716; 106/718; 106/737; 264/333; 264/DIG. 43
(58) Field of Classification Search ................... 106/713, 106/644, 705, 716, 718, 737; 264/333, DIG. 43
See application file for complete search history.

(56) References Cited

U.S. PATENT DOCUMENTS 3,902,912 A * 9/1975 Wolf .............................. 106/711
5,017,232 A * 5/1991 Miceli .......................... 106/711
(Continued)

FOREIGN PATENT DOCUMENTS
EP 1 258 465 11/2002
(Continued)

OTHER PUBLICATIONS

Ductal—FO Gris—formulation 2G0.43 (anciennement BS 1000); Ductal Fiche de caracteristiques techniques; Lafarge Ciments; Jun. 25, 2007; retrieve from the internet on Jun. 17, 2010 at <http://www.ductal-lafarge.com/latarge_DUCTAL/CONTENT_SHEET/20071026/Fiche%20technique%20Ductal-FM%20Gris%202GM2.0F_1.pdf>.

(Continued)

*Primary Examiner* — Paul Marcantoni
(74) *Attorney, Agent, or Firm* — Pillsbury Winthrop Shaw Pittman, LLP

(57) ABSTRACT

A ductile ultra-high performance concrete which includes in relative parts by weight: 100 of Portland cement; 50 to 200 of a sand having a single grading with a D1O to D90 between 0.063 and 5 mm, or a mixture of sands, the finest sand having a D1O to D90 between 0.063 and 1 mm and the coarsest sand having a D1O to D90 between 1 and 5 mm; 0 to 70 of a particulate pozzolanic or non-pozzolanic material or a mixture thereof having a mean particle size less than 15 μm; 0.1 to 10 of a water-reducing superplasticizer; 10 to 30 of water; and 0.5 to 5% by volume relative to the volume of the hardened composition of glass fibers having an aspect ratio of 6 to 120.

23 Claims, 4 Drawing Sheets

Four points bending test on plate

L : length between supports
$L_T$ : length of the plate
e : thickness of the plate
a : length between the two points where the load (F) is applied
b : width of the plate

U.S. PATENT DOCUMENTS

| | | |
|---|---|---|
| 5,916,361 A | 6/1999 | Molloy et al. |
| 2004/0050302 A1* | 3/2004 | Casanova et al. ............. 106/640 |
| 2006/0147681 A1 | 7/2006 | Dubey |

FOREIGN PATENT DOCUMENTS

| | | |
|---|---|---|
| FR | 2 722 813 | 1/1996 |
| GB | 2 148 871 | 6/1935 |
| WO | WO 02/16281 | 2/2002 |

OTHER PUBLICATIONS

Ductal—FM Gris Feu—Formulation 2GM2.0F (anbiennernent IS 1000F); Ductal Fiche de caracteristiques techniques; Lafarge Ciments; Jun. 25, 2007; <http://www.ductal-lafarge.com/lafarge_DUCTAL/CONTENT_Sheet/20071026/Fiche%20technique%20Ductal-FM%20Gris%20Feu%202GM2.0F_1.pdf>.

* cited by examiner

L : length between supports
$L_T$ : length of the plate
e : thickness of the plate
a : length between the two points where the load (F) is applied
b : width of the plate NaN# CONCRETE COMPOSITION

CROSS-REFERENCE TO RELATED APPLICATIONS

This is the U.S. National Stage of PCT/IB2008/003740, filed Dec. 19, 2008, which in turn claims priority to European Patent Application No. 07356178.9, filed Dec. 21, 2007, the entire contents of all applications are incorporated herein by reference in their entireties.

This invention relates to a new ductile ultra-high performance concrete, a process for producing it and its use.

Ultra-high performance concrete generally has a compressive strength at 28 days greater than 100 MPa and generally greater than 120 MPa.

Concrete is widely used in the construction industry as a strong material having, for example, considerable compressive strength. Research does, however, continue for new concrete additives in order to modify and improve the properties of concrete to render it suitable for particular applications.

Additives for concrete include toughening agents in the form of, for example metal or organic fibres. The toughening may be seen in an increase in the fracture energy and/or ductility of the hardened concrete. Ductility is an important and desirable property for a number of applications.

In order to secure desirable ductile behaviour in the concrete the parameters of the fibres and the quantity of fibres must be carefully chosen: these differ between metal and organic fibres (it will be understood that the physicochemical properties of metal and organic fibres are fundamentally different). The fibres are generally of predetermined size in terms of length (L), diameter (D) and aspect ratio (L/D) and must be added in predetermined amounts in order to secure desired improvements in properties.

Metal fibres possess substantial ductility and their incorporation into concrete confers on the thus reinforced concrete materials ductile behaviour which is desirable in certain structural applications. Organic fibres such as polyvinyl alcohol (PVA) have also been used in order to seek ductility in concrete.

Glass and fibres made from it are brittle. Glass differs fundamentally in its physicochemical properties from both metals and organic materials. The incorporation of brittle glass fibres into concrete compositions would not be expected to improve the ductility of those compositions in certain architectural applications.

It has now been discovered that by a suitable choice of glass fibre and of other components of the concrete, and their relative amounts, it is possible to obtain ductile concrete compositions. The present invention seeks to provide such concrete compositions.

The present invention accordingly provides a ductile ultra-high performance concrete which comprises in relative parts by weight:
100 of Portland cement;
50 to 200 (preferably greater than 80, for example 80 to 170, more preferably 100 to 150) of a sand having a single grading with a D10 to D90 between 0.063 and 5 mm, or a mixture of sands (preferably two sands), the finest sand having a D10 to D90 between 0.063 and 1 mm and the coarsest sand having a D10 to D90 between 1 and 5 mm, for example between 1 and 4 mm;
0 to 70, preferably 10 to 60, for example about 50 (10 to 40 may also be used) of a particulate pozzolanic or non-pozzolanic material or a mixture thereof having a mean particle size less than 15 μm;
0.1 to 10 of a water-reducing superplasticizer;
10 to 30 of water; and
0.5 to 5% by volume relative to the volume of the hardened composition of glass fibres having an aspect ratio of 6 to 120, preferably 10 to 80, for example 20 to 40, more preferably about 20.

BRIEF DESCRIPTION OF THE DRAWINGS

Embodiments of the invention will now be described, by way of example only, with reference to the accompanying schematic drawings, and in which.

Figure 1:
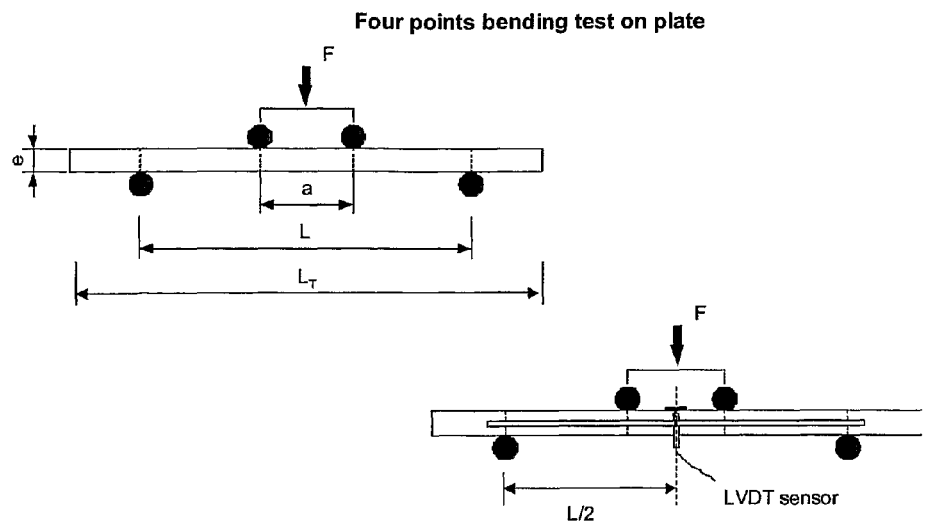
FIG. 1 shows the geometry of a test apparatus.

The fibres may be monofilament or multifilament (each individual fibre then comprising a plurality of filaments).

Glass fibres are generally formed by attenuating streams of molten glass from a bush or orifice. An aqueous sizing composition or chemical treatment may be applied to the fibres.

Aqueous sizing compositions may comprise a lubricant, coupling agent and film-forming binder resin: the treated fibres are generally heated to remove water and cure the size composition on the surface of the fibres.

Chemical treatment may be effected using a composition which comprises a silane coupling agent and a film-forming agent.

The term "sizing" as used in this specification embraces aqueous sizing compositions and chemical treatment.

Silane coupling agents include aminosilanes, silane esters, vinyl silanes, methacryloxy silanes, epoxy silanes, sulphur silanes, ureido silanes, isocyanato silanes and mixtures thereof.

Film-forming agents include blocked polyurethane film formers, thermoplastic polyurethane film formers, epoxy resin film formers, polyolefines, modified polyolefines, functionalised polyolefines, polyvinyl acetate, polyacrylates, saturated polyester resin film-formers, unsaturated polyester resin film-formers, polyether film-formers and mixtures thereof. The glass in the fibres is generally alkali resistant. The fibres are preferably sized to promote abrasion resistance and/or filament integrity during concrete mixing. Sizing is preferred in multifilament fibres to avoid or reduce separation of filaments during mixing.

The percentage by volume of glass fibres in the concrete is preferably more than about 1% by volume, for example 2 to 5%, preferably about 2 to 3%; a preferred value is about 2%.

The diameter of individual filaments in multifilamentary fibres is generally less than about 30 μm. The number of individual filaments in each individual fibre is generally 50 to 200, preferably about 100. The composite diameter of multifilamentary fibre is generally from 0.1 to 0.5 mm, preferably about 0.3 mm; they are generally approximately circular in cross-section.

The glass generally has a Young's modulus greater than or equal to 60 GPa, preferably 70 to 80 GPa, for example 72 to 75 GPa, more preferably about 72 GPa.

The length of the glass fibres is generally greater than the aggregate (or sand) particle size. The fibre length is preferably at least three times greater than the particle size. A mixture of lengths may be used. The length of the glass fibres is generally 3 to 20, for example 4 to 20 mm, preferably 4 to 12 mm, for example about 6 mm.

The tensile strength of the multifilament glass fibre is generally about 1700 MPa or more.

The saturation dosage of glass fibres ($S_f$) in the composition is expressed by the formula:

$$S_f = V_f \times L/D$$

wherein $V_f$ is the actual volume of the fibres. In the ductile compositions of the invention $S_f$ is generally 0.5 to 5, preferably 0.5 to 3. In order to obtain good flowability of the fresh concrete mixture $S_f$ is generally up to about 2. The actual volume can be calculated from the weight and density of the glass fibres.

The surface of the glass fibres in the concrete according to the invention is preferably hydrophilic, in which case the bonding is generally stronger. When the surface is hydrophobic the content of glass fibre is preferably raised to 2 to 5%, more preferably to 3 to 4%.

The sand is generally a silica or limestone sand, a calcined bauxite or a particulate metallurgical residue; the fine sand may also comprise a ground hard dense mineral material, for example a ground vitrified slag. A preferred mixture of sands comprises a mixture (preferably of two sands), the finest sand having a D10 to D90 between 0.063 and 1 mm and the coarsest sand having a D10 to D90 between 1 and 5 mm.

The concrete according to the invention is preferably a self-placing concrete. It preferably has a Vicat setting time from 2 to 18 hours, for example from 4 to 14 hours.

UHPCs generally exhibit higher shrinkage on setting due to their higher cement content. The total shrinkage may be reduced by the inclusion, generally of 2 to 8, preferably 3 to 5, for example about 4 parts, of quicklime, burnt lime or calcium oxide in the mixture before addition of water.

Suitable pozzolanic materials include silica fume, also known as micro-silica, which is a by-product in the production of silicon or ferrosilicon alloys. It is known as a reactive pozzolanic material.

Its main constituent is amorphous silicon dioxide. Individual particles generally have a diameter of about 5 to 10 nm. Individual particles agglomerate to form 0.1 to 1 μm agglomerates and then may aggregate together into 20 to 30 μm aggregates. Silica fume generally has a BET surface area of 10-30 m$^2$/g.

Other pozzolanic materials include aluminosilicate-rich materials such as metakaolin and natural pozzolans with volcanic, sedimentary, or diagenic origins.

Suitable non-pozzolanic materials also include calcium carbonate-containing material (for example ground or precipitated calcium carbonate), preferably a ground calcium carbonate. The ground calcium carbonate may be, for example, Durcal® 1 (OMYA, France).

The non-pozzolan preferably has a mean particle size of less than 5 μm, for example 1 to 4 μm. The non-pozzolan may be a ground quartz, for example C800 which is a substantially non-pozzolanic silica filler available from Sifraco, France.

The preferred BET surface area (determined by known methods) of ground calcium carbonate or quartz is 2-10 m$^2$/g, generally less than 8 m$^2$/g, for example 4 to 7 m$^2$/g, preferably less than 6 m$^2$/g.

Precipitated calcium carbonate is also a suitable non-pozzolanic material. Individual (primary) particles generally have a particle size of about 20 nm. Individual particles agglomerate into clusters having a (secondary) particle size of about 0.1 to 1 μm. The clusters themselves form agglomerates having a (ternary) particle size greater than 1 μm.

A single non-pozzolan or a mixture of non-pozzolans may be used, for example ground calcium carbonate, ground quartz or precipitated calcium carbonate or a mixture thereof. A mixture of pozzolanic materials or a mixture of pozzolanic and non-pozzolanic materials may also be used.

The concrete according to the invention may be used in association with toughening elements, for example metal and/or organic fibres and/or other toughening elements described hereinafter.

The compositions of the invention may comprise metal and/or organic fibres. The amount by volume of fibres is generally from 0.5 to 8% relative to the volume of the hardened concrete. The amount of metal fibres, expressed in terms of the volume of the final hardened concrete is generally less than 4%, for example from 0.5 to 3.5%, preferably about 2%. The amount of organic fibres, expressed on the same basis, is generally from 1 to 8%, preferably 2 to 5%. Metal fibres are generally chosen from steel fibres, such as high strength steel fibres, amorphous steel fibres or stainless steel fibres. Optionally, the steel fibres may be coated with a non-ferrous metal such as copper, zinc, nickel (or their alloys).

The individual length (l) of the metal fibres is generally at least 2 mm and is preferably 10-30 mm. The l/d ratio (d being the diameter of the fibres) is generally from 10 to 300, preferably 30 to 300, and more preferably 30 to 100.

Fibres having a variable geometry may be used: they may be crimped, corrugated or hooked at the ends. The roughness of the fibres may also be varied and/or fibres of variable cross-section may be used; the fibres may be obtained by any suitable technique, including by braiding or cabling several metal wires, to form a twisted assembly.

The bonding of the metal fibres in the cementitious matrix may be promoted by treating the surface of the fibres. This fibre treatment may be carried out by one or more of the following processes: fibre etching; or deposition of a mineral compound on the fibres, especially by depositing silica or a metal phosphate.

The etching may be carried out, for example, by contacting the fibres with an acid, followed by neutralization.

Silica may be deposited by contacting the fibres with a silicon compound, such as a silane, a siliconate or a silica sol. It will be understood that the silica or phosphate is then substantially confined to the surface of the metal fibres in the concrete matrix and is not uniformly dispersed in the matrix.

Phosphatizing treatments are known and are described, for example, in the article by G. LORIN entitled "The Phosphatizing of Metals" (1973), Pub. Eyrolles.

In general, a metal phosphate is deposited using a phosphatizing process, which comprises introducing prepickled metal fibres into an aqueous solution comprising a metal phosphate, preferably manganese phosphate or zinc phosphate, and then filtering the solution in order to recover the fibres: the fibres are then rinsed, neutralized and rinsed again. Unlike in the usual phosphatizing process, the fibres obtained do not have to undergo grease-type finishing; they may, however, optionally be impregnated with an additive either in order to provide anticorrosion protection or to make it easier for them to be processed with a cementitious medium. The phosphatizing treatment may also be carried out by coating or spraying a metal phosphate solution onto the fibres.

Organic fibres include polyvinyl alcohol fibres (PVA), polyacrylonitrile fibres (PAN), polyethylene fibres (PE), high density polyethylene fibres (HDPE), polypropylene fibres (PP), homo- or copolymers, polyamide or polyimide fibres. Mixtures of these fibres can also be used. The organic reinforcing fibres used in the invention may be classified as: high modulus reactive fibres, low modulus non-reactive fibres and reactive fibres. The presence of organic fibres makes it possible to modify the behaviour of the concrete to heat or fire.

Melting of organic fibres makes it possible to develop pathways through which steam or water under pressure can escape when the concrete is exposed to high temperatures.

The organic fibres may be present as a monostrand or multistrand; the diameter of the mono- or multistrand is preferably from 10 µm to 800 µm. The organic fibres may also be used in the form of woven or non-woven structures or of a hybrid strand comprising a different filament.

The individual length of the organic fibres is preferably 5 mm to 40 mm, preferably 6 to 12 mm; the organic fibres are preferably PVA fibres.

The optimum quantity of organic fibres used generally depends on the fibre geometry, their chemical nature and their intrinsic mechanical properties (e.g. elastic modulus, flowing threshold, mechanical strength).

The l/d ratio, d being the fibre diameter and l the length, is generally from 10 to 300, preferably 30 to 90.

Binary hybrid fibres comprising glass and (a) metal or (b) organic fibres and ternary hybrid fibres comprising glass, metal and organic fibres may also be used. A mixture of glass and organic and/or metal fibres may also be used: a "hybrid" composite is thereby obtained the mechanical behaviour of which may be adapted depending upon the required performance. The compositions preferably comprise polyvinyl alcohol (PVA) fibres. The PVA fibres generally have a length of 6 to 12 mm. They generally have a diameter of 0.1 to 0.3 mm.

The use of blends of fibres having different properties and lengths permits modification of the properties of the concrete containing them.

The cement in the concrete of the invention is preferably a white cement. Suitable cements are the silica fume-free Portland cements described in Lea's Chemistry of Cement and Concrete. The Portland cements include slag; pozzolana; fly ash; burnt shale; limestone; and composite cements. A preferred cement for use in the invention is CEM 1 (generally PMS).

The water/cement weight ratio of the composition according to the invention may vary if cement substitutes are used, more particularly pozzolanic materials. The water/binder ratio is defined as the weight ratio of the water amount E to the added weight of the cement and any pozzolans: it is generally from about 15 to 30%, preferably from 20% to 25%. The water/binder ratio may be adjusted using, for example water-reducing agents and/or superplasticizers.

In the Concrete Admixtures Handbook, Properties Science and Technology, V. S. Ramachandran, Noyes Publications, 1984:

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used. The amount of superplasticizer required generally depends on the reactivity of the cement. The lower the reactivity the lower the amount of superplasticizer required. In order to reduce the total alkali content the superplasticizer may be used as a calcium rather than a sodium salt.

Other additives may be added to the composition according to the invention, for example, a defoaming agent (e.g. poly-dimethylsiloxane). These also include silicones in the form of a solution, a solid or preferably in the form of a resin, an oil or an emulsion, preferably in water. More particularly suitable are silicones comprising (RSiO0.5) and (R2SiO) moieties.

In these formulae, the R radicals, which may be the same or different, are preferably hydrogen or an alkyl group of 1 to 8 carbon atoms, the methyl group being preferred. The number of moieties is preferably from 30 to 120.

The amount of such an agent in the composition is generally at most 5 parts in weight relative to the cement.

The compositions of the invention may also include hydrophobic agents to increase water repellency and reduce water absorption and penetration in solid structures comprising compositions of the invention. Such agents include silanes, siloxanes, silicones and siliconates; commercially available products include water-dilutable and solvent-dilutable liquids and solid, for example granular, products.

The compositions of the invention may also include anti-efflorescence agents (for controlling primary and/or secondary efflorescence). Such agents include formulations comprising a water-repelling acid component such as a liquid fatty acid mixture (e.g. tall oil fatty acid which may contain a water-insoluble fatty acid, rosin acid or mixture thereof) for primary efflorescence and aqueous admixtures comprising calcium stearate dispersion (CSD) for secondary efflorescence. Anti-efflorescence agents for controlling primary and secondary efflorescence include compositions comprising a water repelling acid component, generally selected from fatty acids, rosin acids and mixtures thereof and an aqueous calcium stearate dispersion. The term calcium stearate dispersion generally refers to a dispersion of calcium stearate, calcium palmitate, calcium myristate or combination thereof. Silicates, for example alkali silicates, may also be included in the compositions of the invention to combat efflorescence. Similar products may be used as surface treatments on hardened compositions of the invention.

The concrete may be prepared by known methods, including mixing the solid components and water, shaping (moulding, casting, injection, pumping, extrusion, calendering), and then hardening.

They can also exhibit a compression strength $R_c$ of at least 100 MPa.

In order to prepare the concrete according to the invention the constituents and reinforcing fibres are mixed with water. The following order of mixing may, for example, be adopted: mixing of the pulverulent constituents of the matrix; introduction of the water and a fraction, for example half, of the admixtures; mixing; introduction of the remaining fraction of the admixtures; mixing; introduction of the reinforcing fibres and the additional constituents; mixing.

The concrete may be subjected to a thermal cure to improve its mechanical properties. Curing is generally conducted at a temperature from ambient temperature (e.g. 20° C. to 90° C.), preferably from 60° C. to 90° C. The curing temperature should be less than the boiling point of water at the ambient pressure. The curing temperature is generally less than 100° C. Autoclaving in which curing is conducted at elevated pressures allows higher curing temperatures to be used.

The cure time may be, for example, 6 hours to 4 days, preferably about 2 days. Curing is started after setting, generally at least one day after setting has started and preferably on concrete which is 1 day up to about 7 days old at 20° C.

The cure may be performed in dry or wet conditions or in cycles alternating both environments, for example, a 24 hour cure in a humid environment followed by a 24 hour cure in a dry environment.

Strengthening means used in association with the concrete according to the invention also include pretensioning, for example, by bonded wires or by bonded tendons, or post-tensioned, by single unbonded tendons or by cables or by sheaths or bars, the cable comprising an assembly of wires or comprising tendons.

The concrete according to the invention will generally be used in "thin elements", for example those having a ratio of length to thickness of more than about 10, generally having a thickness of 10 to 30 mm in, for example, cladding elements.

In mixing the components of the concrete according to the invention the particulate materials other than the cement may be introduced as pre-mixed dry powders or dilute or concentrated aqueous suspensions.

Unless otherwise specified, in this specification including the accompanying claims: The term "ductile" as used in relation to the invention refers to the behaviour in bending mode (not in traction mode) of a concrete plate whose dimensions are in accordance with the definition of a "thin element", for example having a ratio of length to thickness of more than about 10, for example having a maximum thickness of 40 mm. Ductility exists when the maximum load or the maximum strength is greater than the elastic limit for a given deflection (or crack opening). The larger the deflection or crack opening at which the maximum load occurs the greater the ductility. This behaviour is known in the literature as "deflection-hardening".

The ductile behaviour of the concrete of the invention is determined by a four point bending test on concrete plates (dimensions 450×145×20 mm) using a hydraulic DARTEC HA 250 (Zwick) apparatus. Measurement is conducted on the basis of a constant deformation with time (not a constant increase of load with time). The rate of deformation (0.1 mm/min) is regulated using an LVDT sensor fixed to the concrete plate. The sensor also records the deflection of the plate.

The geometry of the test apparatus is shown in FIG. 1 of the accompanying drawings in which dimensions are as follows:

| | |
|---|---|
| L (length between supports) | 420 mm |
| $L_T$ (length of plate) | 450 mm |
| E (thickness of plate) | 20 mm |
| a (distance between the two points where the load F is applied) | 140 mm |
| width of plate (not depicted) | 145 mm |

The diameter of the cylinders supporting the plate and of the cylinders applying the load is about 10 mm.

The term "modulus" as used in this specification including the accompanying claims, refers to Young's modulus (modulus of elasticity).

Compressive strength values are measured after moist curing for 28 days at 20° C., on a cylindrical test sample having a diameter of 7 cm and a height of 14 cm (the concrete according to the invention generally has a compressive strength greater than about 100 MPa);

percentages, unless otherwise specified, are by weight (percentages of glass fibres are by volume relative to the volume of the hardened composition);

Surface areas of materials are measured by the BET method using a Beckman Coulter SA 3100 apparatus with nitrogen as the adsorbed gas;

Slump values (dynamic, with shocks—normally 20—at intervals of about 1 second, or static, without shocks) are measured on a circular shock table (diameter 300 mm, thickness 5.9 mm, weight about 4.1 kg) with a drop of about 12 mm. Test samples (500 ml) are prepared using a flattened conical mould, height 50 mm, top diameter 70 mm, bottom diameter 100 mm; static values (before or without shocks) are measured after the sample has stopped moving after demoulding.

Mean particle sizes and distributions of particles, for example the particulate non-pozzolan, e.g. calcium carbonate, are measured by laser granulometry using a Malvern Mastersizer 2000;

The invention is illustrated by the following non-limiting Examples. In the Examples materials used are available from the following suppliers:

| | |
|---|---|
| (1) White cement | Lafarge France Le Teil cement |
| (2) Grey cement(HTS) | Lafarge France Le Teil cement |
| (3) Limestone filler Durcal 1 Durcal 1 has a BET value of about 5 m²/g | OMYA, France |
| (4) Sand Be01 | Sifraco, France |
| (5) Superplasticizer F2 | Chryso, France |
| (6) Siliceous filler C400 C400 has a BET value of 1.61 m²/g. | Sifraco, France |
| (7) Admixture F2 | Chryso, France |
| (8) PVA fibres (length 12 mm, diameter 0.2 mm) | Kuraray, Japan |
| (9) Glass fibres | OCV Reinforcement |
| (10) White silica fume MST | SEPR, France |
| (11) Grey silica fume 980NS | SEPR, France |

The glass fibres comprise about 100 monofilaments of 14 μm diameter in a sized fibre of overall diameter about 0.3 mm. The size is resistant to the mixing process to avoid separation of the monofilaments. The glass fibres used in the following Examples have the following properties:

| | |
|---|---|
| Length (mm) | 6 |
| Diameter (mm) | 0.3 |
| Specific gravity | 2.6 |
| E (GPa) | 72 |
| Rt (Mpa) | 1700 |

EXAMPLE 1

The composition of a white concrete matrix was as follows (the quantities are in parts by weight):

|  | Quantity (kg/m³) | Relative amounts |
|---|---|---|
| White cement | 686 | 1 |
| Filler (Durcal 1) | 239 | 0.35 |
| Filler (C400) | 165 | 0.24 |
| Sand (BE 01) | 981 | 1.43 |
| Adjuvant (F2) (volume %) | 32 | 0.046(3%) |
| Glass fibres (HP anti crack fibres) | (a) 2.5% of 6 mm glass fibres (b) 2% of 6 mm glass fibres and 0.7% PVA fibres | |
| W/C | | 0.28 |
| Mixing apparatus | Rayneri | |

The mixture is moulded into a large plate (dimensions 500×450×20 mm). The plate is demoulded 24 hours after contact between cement and water. The demoulded plate is stored at 20° C. and 100% relative humidity. The plate is then cut into 3 pieces (dimensions 450×145×20 mm) before testing.

The ductile behaviour of the plates is determined by the four point bending test using a hydraulic DARTEC HA 250 (Zwick) apparatus as described above.

Figure 2:
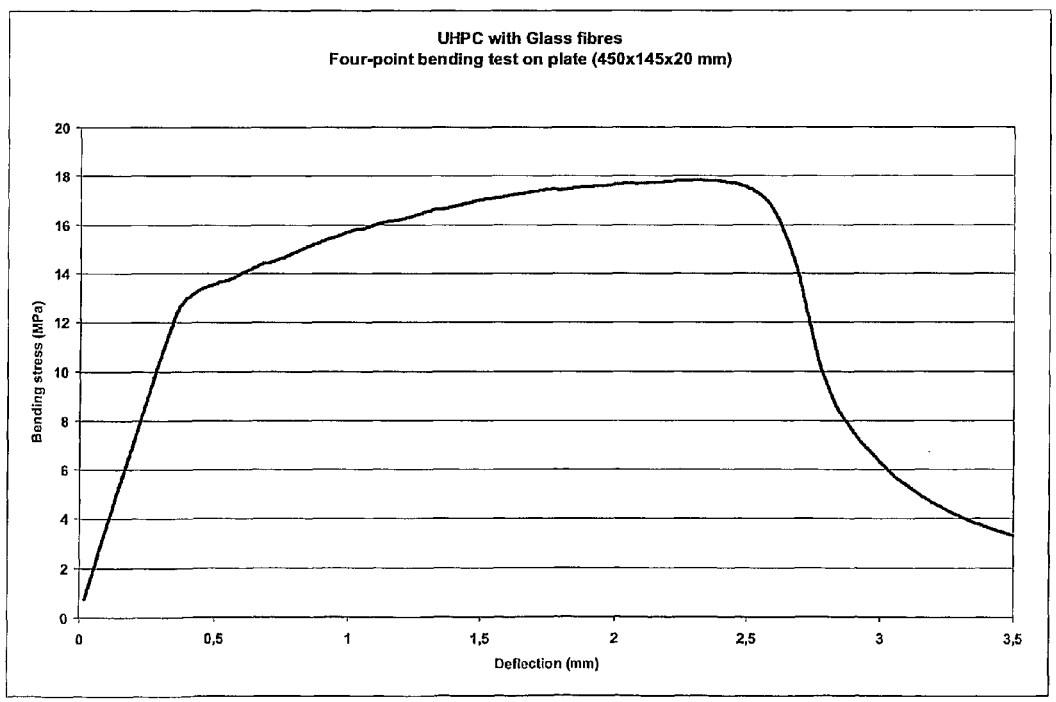
FIG. 2 shows the ductile behavior of a concrete composition according to an embodiment of the invention.
Figure 3:
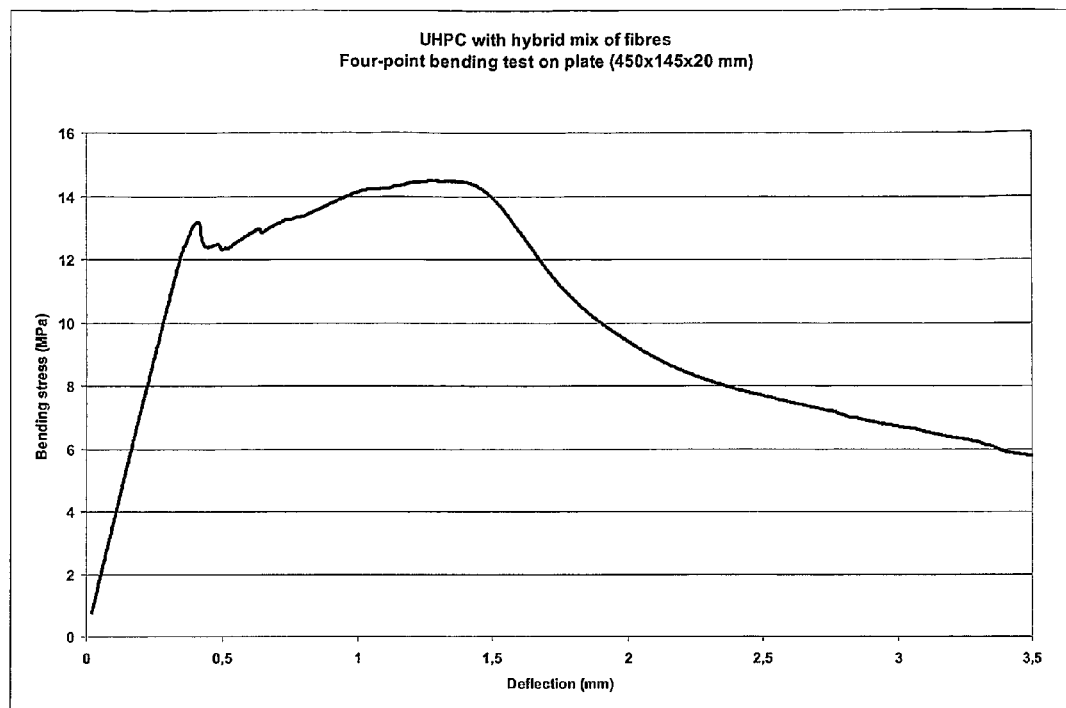
FIG. 3 shows the ductile behavior of a concrete composition according to an embodiment of the invention.

The results obtained are shown in FIGS. 2 and 3 which demonstrate the ductile behaviour of the concrete compositions according to the invention.

EXAMPLE 2

The composition of a white concrete matrix was as follows (the quantities are in parts by weight):

|  | Quantity (kg/m³) | Relative amounts |
|---|---|---|
| White cement | 688 | 1 |
| Silica fume (MST) | 209 | 0.3 |
| Filler (C400) | 167 | 0.24 |
| Sand (BE 01) | 997 | 1.43 |
| Adjuvant (F2) (volume %) | 32 | 0.046(3%) |
| Glass fibres(HP anti crack fibres) | 2.42% of 6 mm glass fibres | |
| W/C | | 0.28 |
| Mixing apparatus | Rayneri | |

The mixture is moulded into a large plate (dimensions 500×450×20 mm). The plate is demoulded 24 hours after contact between cement and water. The demoulded plate is stored at 20° C. and 100% relative humidity. The plate is then cut into 3 pieces (dimensions 450×145×20 mm) before testing.

The ductile behaviour of the plates is determined by the four point bending test using a hydraulic DARTEC HA 250 (Zwick) apparatus as described above.

Figure 4:
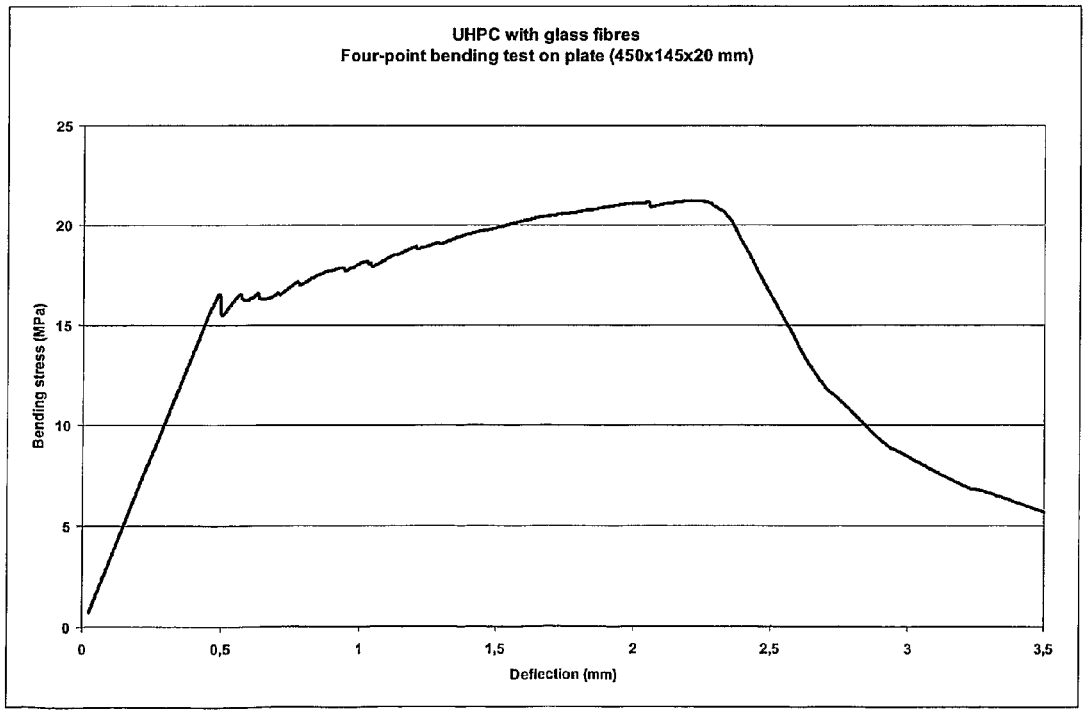
FIG. 4 shows the ductile behavior of a concrete composition according to an embodiment of the invention.

The results obtained are shown in FIG. 4 which demonstrates the ductile behaviour of the concrete compositions according to the invention.

EXAMPLE 3

The composition of a grey concrete matrix was as follows (the quantities are in parts by weight):

|  | Quantity (kg/m³) | Relative amounts |
|---|---|---|
| Grey cement | 772 | 1 |
| Filler (Durcal 1) | 386 | 0.5 |
| Sand (BE 01) | 1057 | 1.37 |
| Adjuvant (F2) (volume %) | 26.2 | 0.034(2.4%) |
| Glass fibres(HP anti crack fibres) | 2.25% of 6 mm glass fibres | |
| W/C | | 0.24 |
| Mixing apparatus | Rayneri | |

The mixture is moulded into a large plate (dimensions 500×450×20 mm). The plate is demoulded 24 hours after contact between cement and water. The demoulded plate is stored at 20° C. and 100% relative humidity. The plate is then cut into 3 pieces (dimensions 450×145×20 mm) before testing.

The ductile behaviour of the plates is determined by the four point bending test using a hydraulic DARTEC HA 250 (Zwick) apparatus as described above.

Figure 5:
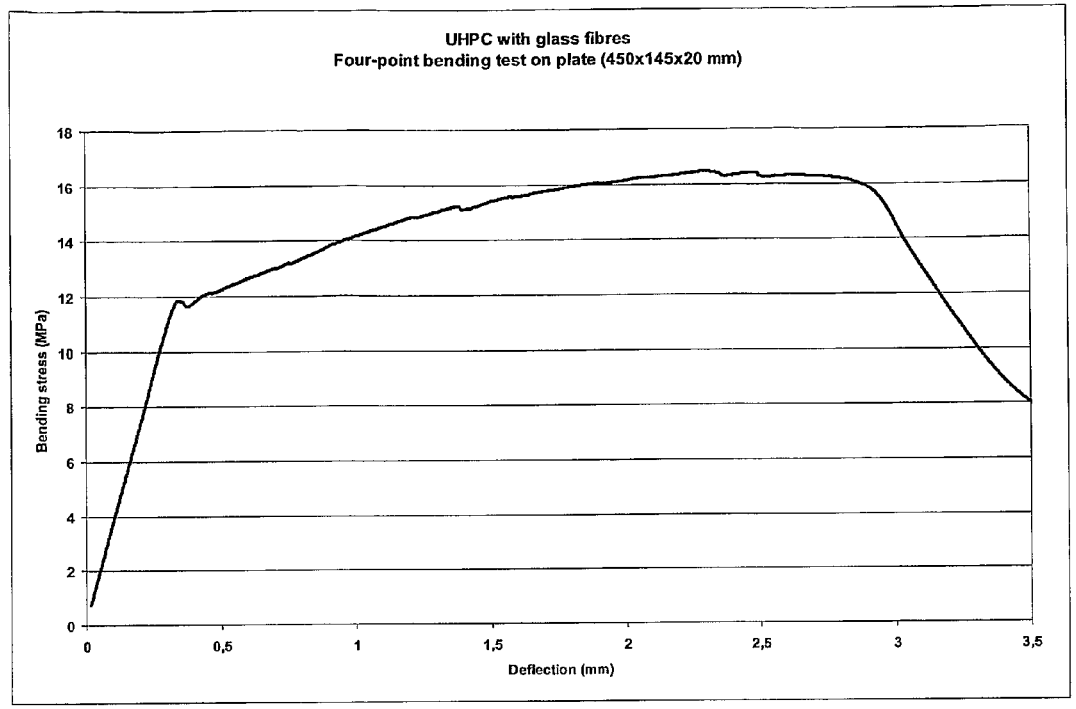
FIG. 5 shows the ductile behavior of a concrete composition according to an embodiment of the invention.

The results obtained are shown in FIG. 5 which demonstrates the ductile behaviour of the concrete compositions according to the invention.

EXAMPLE 4

The composition of a white concrete matrix was as follows (the quantities are in parts by weight):

|  | Quantity (kg/m³) | Relative amounts |
|---|---|---|
| White cement | 745 | 1 |
| Filler (Durcal 1) | 373 | 0.5 |
| Sand (BE 01) | 1066 | 1.43 |
| Adjuvant (F2) (volume %) | 32.6 | 0.044(3%) |
| Glass fibres(HP anti crack fibres) | 2.25% of 6 mm glass fibres | |
| W/C | | 0.26 |
| Mixing apparatus | Rayneri | |

The mixture is moulded into a large plate (dimensions 500×450×20 mm). The plate is demoulded 24 hours after contact between cement and water. The demoulded plate is stored at 20° C. and 100% relative humidity. The plate is then cut into 3 pieces (dimensions 450×145×20 mm) before testing.

The ductile behaviour of the plates is determined by the four point bending test using a hydraulic DARTEC HA 250 (Zwick) apparatus as described above.

Figure 6:
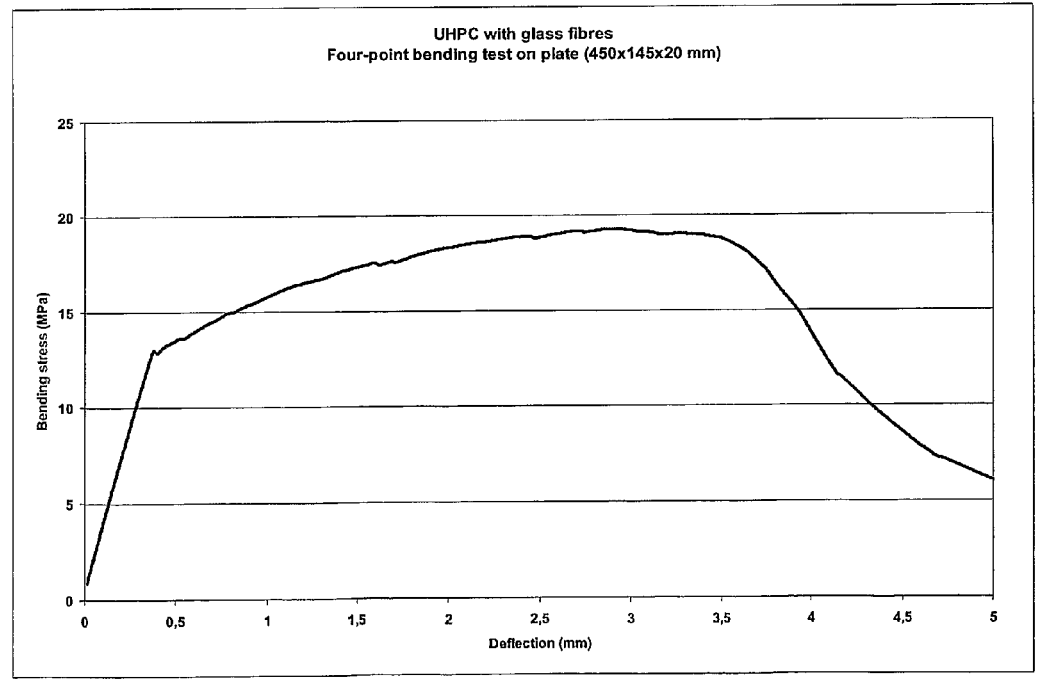
FIG. 6 shows the ductile behavior of a concrete composition according to an embodiment of the invention.

The results obtained are shown in FIG. 6 which demonstrates the ductile behaviour of the concrete compositions according to the invention.

EXAMPLE 5

The composition of a white concrete matrix was as follows (the quantities are in parts by weight):

|  | Quantity (kg/m³) | Relative amounts |
|---|---|---|
| White cement | 754 | 1 |
| Filler (Durcal 1) | 256 | 0.34 |
| Silica fume (MST) | 98 | 0.13 |
| Sand (BE 01) | 1078 | 1.43 |
| Adjuvant (F2) (volume %) | 27.1 | 0.036(2.5%) |
| Glass fibres(HP anti crack fibres) | 2.5% of 6 mm glass fibres | |
| W/C | | 0.26 |
| Mixing apparatus | Rayneri | |

The mixture is moulded into a large plate (dimensions 500×450×20 mm). The plate is demoulded 24 hours after contact between cement and water. The demoulded plate is stored at 20° C. and 100% relative humidity. The plate is then cut into 3 pieces (dimensions 450×145×20 mm) before testing.

The ductile behaviour of the plates is determined by the four point bending test using a hydraulic DARTEC HA 250 (Zwick) apparatus as described above.

Figure 7:
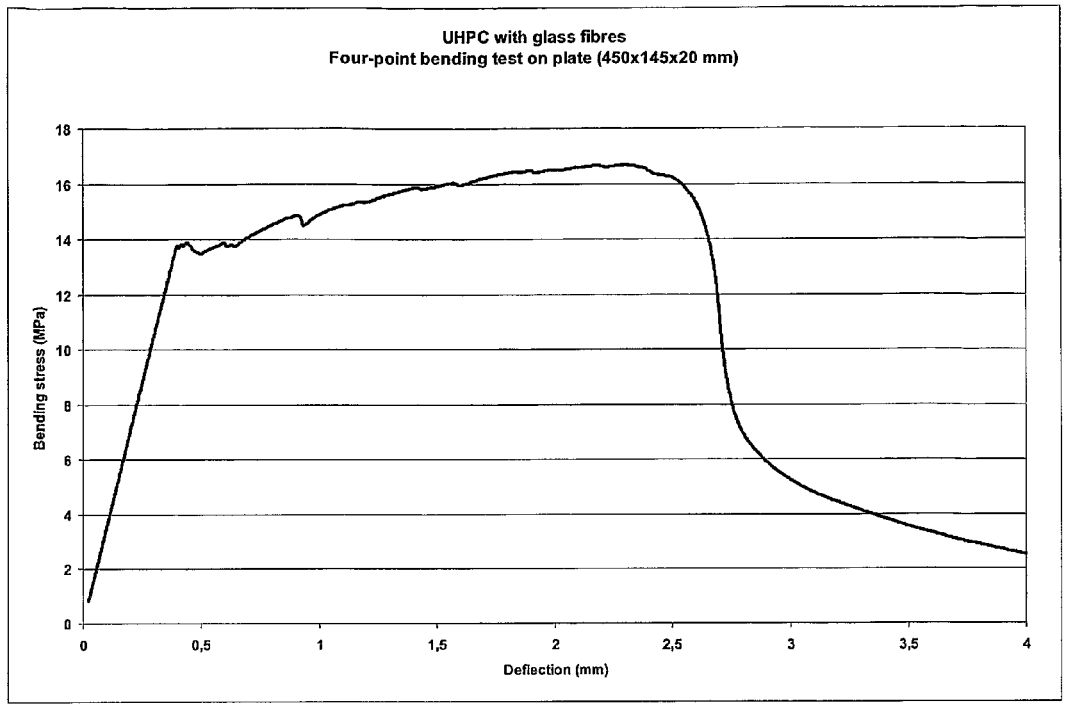
FIG. 7 shows the ductile behavior of a concrete composition according to an embodiment of the invention.

The results obtained are shown in FIG. 7 which demonstrates the ductile behaviour of the concrete compositions according to the invention.

EXAMPLE 6

The composition of a grey concrete matrix was as follows (the quantities are in parts by weight):

|  | Quantity (kg/m³) | Relative amounts |
|---|---|---|
| Grey cement | 776 | 1 |
| Filler (Durcal 1) | 264 | 0.34 |
| Silica fume (980NS) | 101 | 0.13 |
| Sand (BE 01) | 1063 | 1.37 |
| Adjuvant (F2) (volume %) | 27.2 | 0.035(2.5%) |
| Glass fibres(HP anti crack fibres) | 2.2% of 6 mm glass fibres | |
| W/C |  | 0.24 |
| Mixing apparatus | Rayneri | |

The mixture is moulded into a large plate (dimensions 500×450×20 mm). The plate is demoulded 24 hours after contact between cement and water. The demoulded plate is stored at 20° C. and 100% relative humidity. The plate is then cut into 3 pieces (dimensions 450×145×20 mm) before testing.

The ductile behaviour of the plates is determined by the four point bending test using a hydraulic DARTEC HA 250 (Zwick) apparatus as described above.

Figure 8:
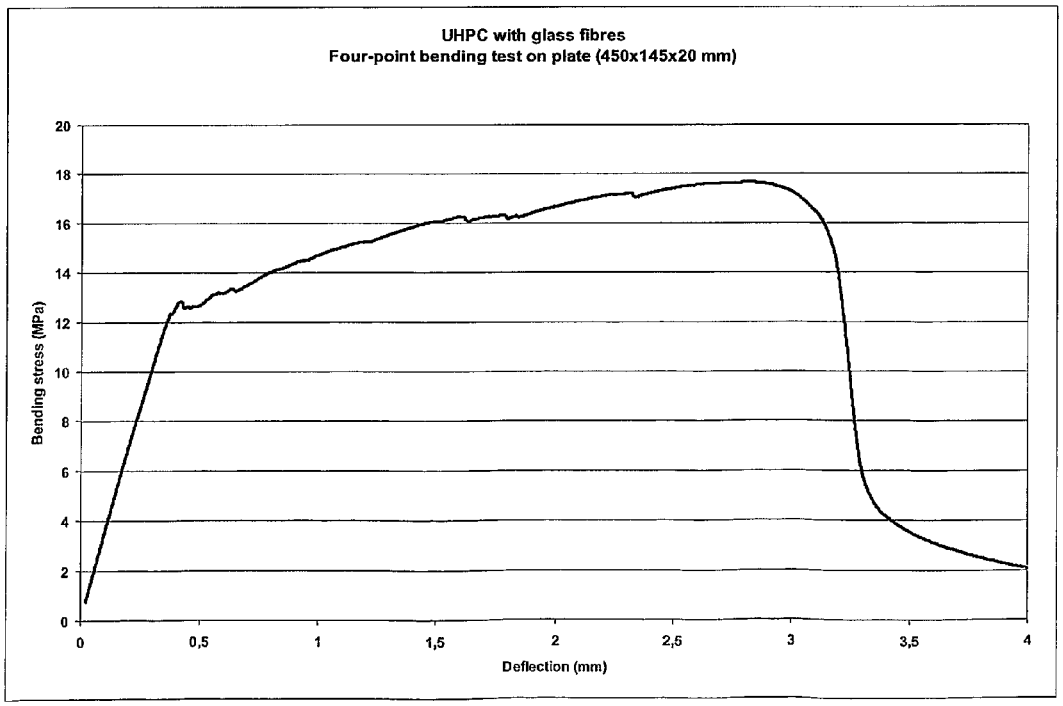
FIG. 8 shows the ductile behavior of a concrete composition according to an embodiment of the invention.

The results obtained are shown in FIG. 8 which demonstrates the ductile behaviour of the concrete compositions according to the invention.

The invention claimed is:

1. A ductile ultra-high performance concrete which comprises in relative parts by weight:
   100 parts by weight of Portland cement;
   50 to 200 parts by weight of a sand having a single grading with a D10 to D90 between 0.063 and 5 mm, or a mixture of sands, the finest sand having a D10 to D90 between 0.063 and 1 mm and the coarsest sand having a D10 to D90 between 1 and 5 mm;
   0 to 70 parts by weight of a particulate pozzolanic or non-pozzolanic material or a mixture thereof having a mean particle size less than 15 μm;
   0.1 to 10 parts by weight of a water-reducing superplasticizer;
   10 to 30 parts by weight of water; and
   0.5 to 5% by volume relative to the volume of the hardened composition of glass fibres having an aspect ratio of 6 to 120.

2. A concrete according to claim 1, wherein each glass fibre comprises a plurality of filaments.

3. A concrete according to claim 2, wherein the filaments have a diameter of less than 30 μm.

4. A concrete according to claim 2, wherein each glass fibre comprises 50 to 200 filaments.

5. A concrete according to claim 1, wherein the glass fibres have a diameter of 0.1 to 0.5 mm.

6. A composition which comprises in relative parts by weight:
   100 parts by weight of Portland cement;
   50 to 200 parts by weight of a sand having a single grading with a D10 to D90 between 0.063 and 5 mm, or a mixture of sands, the finest sand having a D10 to D90 between 0.063 and 1 mm and the coarsest sand having a D10 to D90 between 1 and 5 mm;
   0 to 70 parts by weight of a particulate pozzolanic or non-pozzolanic material having a mean particle size less than 15 μm;
   0.1 to 10 parts by weight of a water-reducing superplasticizer; and
   0.5 to 5% by volume relative to the volume of the hardened composition of glass fibres having an aspect ratio of 6 to 120,
   wherein said composition is used in the preparation of a concrete according to claim 1.

7. A process for the preparation of a concrete comprising mixing the components of a composition according to claim 6 with water.

8. A composition for preparing a concrete, the composition comprising in relative parts by weight:
   100 parts by weight of Portland cement,
   50 to 200 parts by weight of a sand having a single grading with a D10 to D90 between 0.063 and 5 mm or a mixture of sands the finest sand having a D10 to D90 between 0.063 and 1 mm and the coarsest sand having a D10 to D90 between 1 and 5 mm;
   0 to 70 parts by weight of a particulate pozzolanic or non-pozzolanic material having a mean particle size less than 15 μm;
   0.1 to 10 parts by weight of a water-reducing superplasticizer; and
   0.5 to 5% by volume relative to the volume of the hardened composition of glass fibres having an aspect ratio of 6 to 120.

9. A concrete according to claim 1 in shaped form.

10. A concrete according to claim 1, comprising 0 to 50 parts by weight of the particulate pozzolanic or non-pozzolanic material or the mixture thereof having a mean particle size less than 15 μm.

11. A concrete according to claim 10, comprising 10 to 40 parts by weight of the particulate pozzolanic or non-pozzolanic material or the mixture thereof having a mean particle size less than 15 μm.

12. A concrete according to claim 1, comprising 80 to 170 parts by weight of the sand having a single grading with a D10 to D90 between 0.063 and 5 mm, or the mixture of sands.

13. A concrete according to claim 12, comprising 100 to 150 parts by weight of the sand having a single grading with a D10 to D90 between 0.063 and 5 mm, or the mixture of sands.

14. A concrete according to claim 1, wherein the coarsest sand has a D10 to D90 between 1 and 4 mm.

15. A concrete according to claim 1, wherein the glass fibres have an aspect ratio of 10 to 80.

16. A concrete according to claim 15, wherein the glass fibres have an aspect ratio of 20 to 40.

17. A composition according to claim 6, comprising 0 to 50 parts by weight of the particulate pozzolanic or non-pozzolanic material or the mixture thereof having a mean particle size less than 15 μm.

18. A composition according to claim 17, comprising 10 to 40 parts by weight of the particulate pozzolanic or non-pozzolanic material or the mixture thereof having a mean particle size less than 15 μm.

19. A composition according to claim 6, comprising 80 to 170 parts by weight of the sand having a single grading with a D10 to D90 between 0.063 and 5 mm, or the mixture of sands.

20. A composition according to claim 19, comprising 100 to 150 parts by weight of the sand having a single grading with a D10 to D90 between 0.063 and 5 mm, or the mixture of sands.

21. A composition according to claim 6, wherein the coarsest sand has a D10 to D90 between 1 and 4 mm.

22. A composition according to claim 6, wherein the glass fibres have an aspect ratio of 10 to 80.

23. A composition according to claim 22, wherein the glass fibres have an aspect ratio of 20 to 40.

\* \* \* \* \*